Dec. 9, 1952

H. ERNYEI 2,621,248

SYNCHRONIZING DEVICE

Filed Jan. 5, 1949

2 SHEETS—SHEET 1

INVENTOR
HERBERT ERNYEI
BY
Bailey, Stephens & Huettig
ATTORNEYS

INVENTOR
HERBERT ERNYEI
BY
Bailey, Stephens & Huettig
ATTORNEYS

Patented Dec. 9, 1952

2,621,248

UNITED STATES PATENT OFFICE 2,621,248

SYNCHRONIZING DEVICE

Herbert Ernyei, Paris, France, assignor to Society "La Radio-Industrie," S. A., Paris, France, a society of France Application January 5, 1949, Serial No. 69,322
In France July 5, 1948

3 Claims. (Cl. 178—7.3)

The present invention relates to scanning devices for television receivers.

Its chief object is to provide a device of this kind which is better adapted to meet the requirements of practice than those used for the same purpose up to this time, and in particular a device such that relaxation oscillations cannot be too easily started by signals or impulses other than television synchronizing pulses received from the television transmitted, but that, on the contrary, the scanning circuits oscillate freely on their natural frequency in the absence of reception of synchronizing pulses.

According to an essential feature of my invention, in a device of the above mentioned kind, controlled by at least one relaxation oscillation generator including means for blocking the output thereof and means for periodically neutralizing said blocking means, I provide a device for applying to said blocking means a negative bias such that, outside of the times of reception of synchronizing pulses from the television transmitter, which neutralize said blocking means, the voltage applied to said last mentioned means remains substantially lower than the value for which said blocking means is neutralized, the negative bias voltage necessary for this purpose being supplied in response to the reception of carrier waves from the transmitter, whereby, in the absence of such carrier waves, any bias ceases to be applied and the relaxation device starts oscillating freely.

Preferred embodiments of the present invention will be hereinafter described with reference to the accompanying drawings, given merely by way of example and in which:

Fig. 1 is the lay-out of a multivibrator of a known kind used to ensure scanning in television receivers;

Fig. 2 gives a plurality of waveforms illustrating the operation of various elements of said multivibrator;

Figure 1:
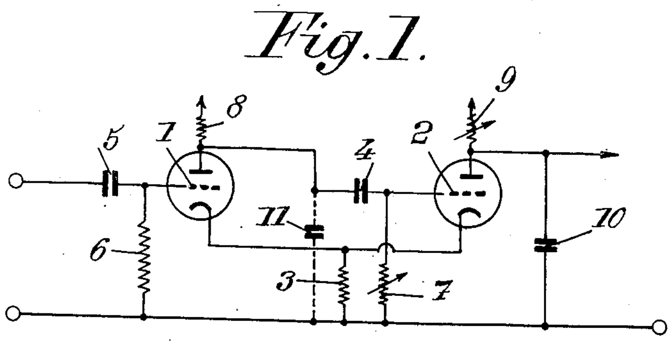

Among the devices capable of producing relaxation oscillations for television receiver scanning devices, it is known to use a cathode coupling multivibrator such as shown by Fig. 1. It is known that such a multivibrator includes chiefly two electronic tubes 1 and 2 coupled on the one hand through a common cathode resistor 3 and on the other hand through a capacitor 4 inserted between the anode of tube 1 and the grid of tube 2. The multivibrator further includes a capacitor 5 and a resistor 6 for biasing the grid of tube 1, a rheostat 7 for biasing the grid of tube 2, a fixed resistor 8 and a variable resistor 9 in the respective plate circuits of tubes 1 and 2 and a capacitor 10 in the plate circuit of tube 2. 11 represents the various parasitic capacities.

I will first summarily explain how relaxation oscillations take place in such a multivibrator. If I take as starting point the time $a$ when tube 2 is blocked by the negative bias on its grid, condenser 10 first gets charged. Tube 1 is conductive and maintains a constant potential on its plate. However its capacitor 4 discharges through resistor 7 so that the bias on the grid of tube 2 decreases gradually until, at time $b$, this tube becomes conductive, which causes capacitor 10 to discharge. Tube 1 is then quickly blocked due to the rise of the cathode potential created in resistor 3. This blocking causes the plate potential to rise quickly. This variation is transmitted to the grid of tube 2 and accelerates the discharging of capacitor 10. Near the end of the discharge of this capacitor, current flow is slowed down in tube 2. Consequently, the cathode potential of tube 1 becomes more negative until time $c$ when this tube again becomes conductive, which has for its effect to apply a negative bias on the grid of tube 2 and to block it. The relaxation cycle is then complete and a new cycle starts.

Figure 2:
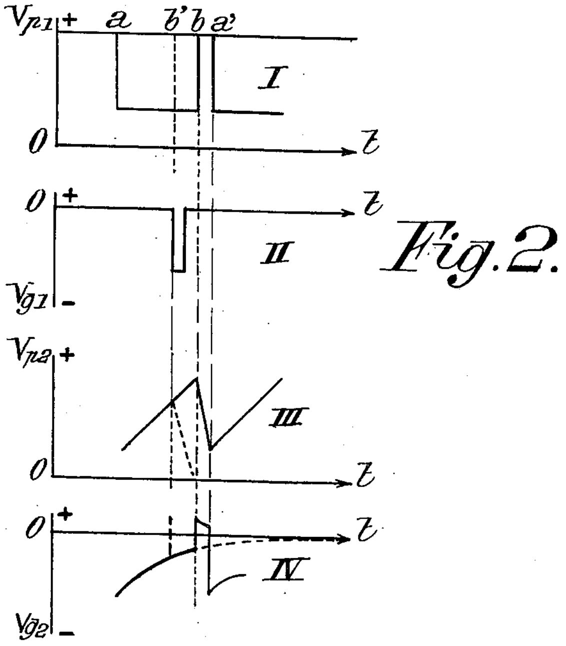

Fig. 2 shows waveforms of the voltage V in various portions of the above described multivibrator. Waveform I relates to the plate $p_1$ of tube 1 and waveform II to the grid $g_1$ of this tube. Waveform III relates to the plate $p_2$ of tube 2 and waveform IV to the grid $g_2$ of this tube. It is known that capacitor 10 can be started discharging at a time $b'$ earlier than $b$ if a negative voltage impulse is sent at this time $b'$ to the grid of tube 1. Such an impulse is shown in waveform II and consists practically in the synchronizing pulse of the television transmission.

It is therefore visible that such a relaxation generator has a natural frequency, which on the other hand can be synchronized to a slightly higher frequency, determined by synchronizing pulses.

Figure 3:
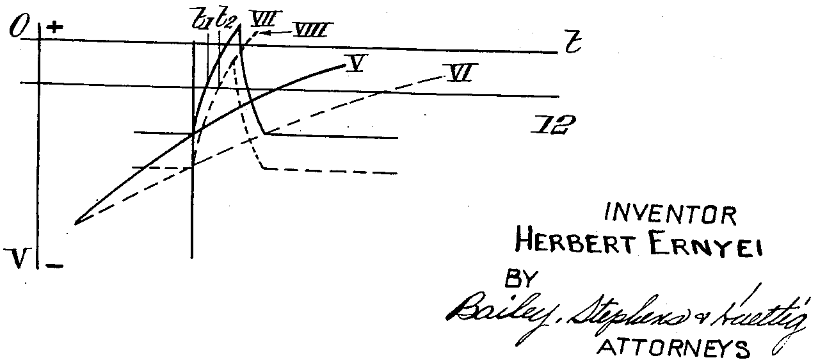
Fig. 3 is another diagram illustrating the irregularities of operation of the above mentioned device.

However, such a generator has drawbacks which result chiefly from a lack of rigorous determination of the time at which oscillations are started. Three main causes can modify this time: first, variations in the direct voltage; secondly, the existence of parasitic oscillations at about the time when capacitor 4 is nearing the end of its discharge, which may have for its effect prematurely to start discharge of capacitor 10; thirdly, anomalies in the feed voltages (for instance a superposition of the network voltage to the high frequency voltage), which may modify the slope of curve V or VI (Fig. 3) which represents the grid voltage of tube 2, and therefore involve an uncertainty as to the time $t_1$ or $t_2$ when the multivibrator is released into oscillation, this time being determined by the intersection of the release level 12 with curves VII and VIII, which represent a synchronizing pulse.

It has been already endeavored to obviate the drawbacks inherent in the above described device. Among the solutions that were proposed, can be mentioned in particular that which consists in replacing the multivibrator by a single tube connected like tube 2 and in which periodical discharges of condenser 10 are produced by a synchronizing pulse of positive value applied to the grid of this tube. This solution has a serious drawback: in the absence of synchronizing pulses, i. e. after the end of the transmission, scanning of the receiver tube ceases and the fluorescent layer of this tube risks being deteriorated by contact of the spot which then remains stationary.

The object of the present invention is to remedy the drawbacks offered by these various relaxation oscillation generators. According to this invention, in a generator in which each relaxation oscillation is released by the neutralizing of an electronic blocking device inserted in the circuit of the generator, a negative bias is applied to this blocking device so that, in the course of normal operation, its base voltage remains substantially below the neutralization voltage of this device, the negative voltage necessary for producing this bias being produced in response to the reception of carrier waves from the television receiver, so that, in the absence of such carrier waves, any bias ceases to be applied on the blocking device and the relaxation device starts oscillating freely.

The invention can apply to any relaxation device. By way of example, it has been hereinafter supposed that it is applied to a multivibrator of the kind above described, but it should be understood that it might as well be applied to other generators, and for instance to blocked oscillators.

Figure 4:
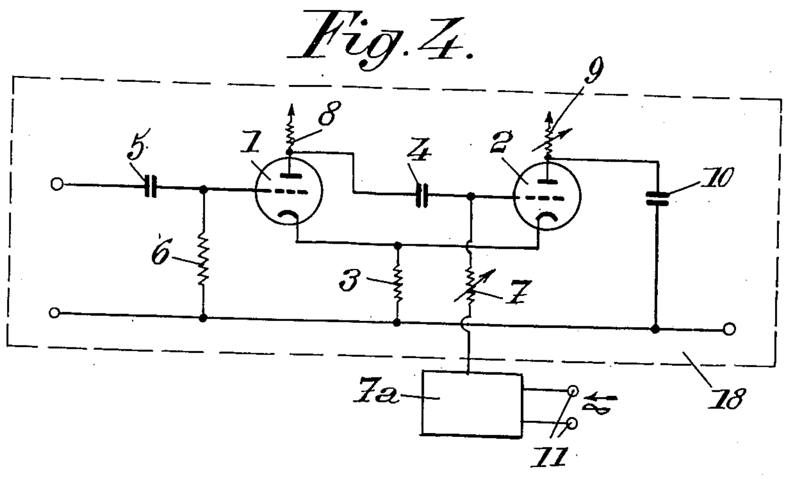
Fig. 4 is the lay-out of a multivibrator made according to my invention.
Figure 5:
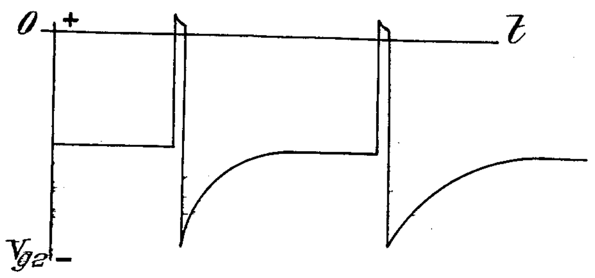
Fig. 5 is a diagram illustrating the normal operation of the grid of the output tube of this last mentioned multivibrator.

Fig. 4 shows a multivibrator made according to the invention. It will be seen that it differs from that of Fig. 1 in that a negative bias is applied to rheostat 7 by means of a device 7a which is to be more explicitly referred to hereinafter. On the other hand, it is advantageous greatly to reduce the time constant of the circuit including capacitor 4 and rheostat 7, so that the curve representing the grid voltage $Vg_2$ of tube 2 with respect to time has an appearance similar to that represented in Fig. 5.

It will be seen that the working of the multivibrator thus modified is quite different from that above described: On the one hand, tube 1 acts only, in this case, as a negative pulse reverser, to transform it into a positive pulse applied to the grid of tube 2, and, on the other hand, when a negative bias is applied to rheostat 7, discharge of capacitor 10 takes place only in response to a synchronizing pulse. In order to have the system oscillating freely in the absence of such pulses, the negative bias must no longer be applied to rheostat 7 in the absence of these pulses, i. e. when there is no transmission. This bias voltage must therefore be created by means of a device 7a controlled by the carrier waves that are received.

This negative bias voltage can be obtained as well from the picture carrier wave as from the sound carrier wave, or again through other means, in particular those for obtaining in television an automatic volume control or antifading voltage. When thus making use of the picture carrier wave, the negative voltage that is obtained should be filtered in a circuit having a very high time constant, in order to eliminate the effects of variations of the direct component of the picture carrier waves.

Figure 6:
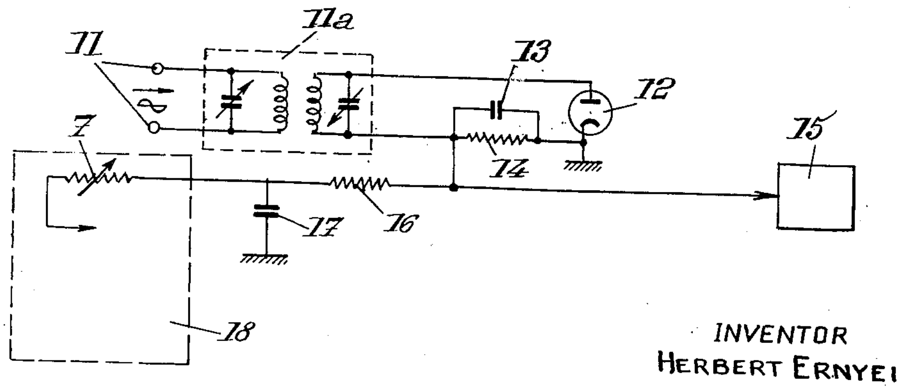
Fig. 6 is a diagram showing a method of filtering the carrier waves that are received to collect therefrom a negative bias voltage.

Fig. 6 shows an advantageous arrangement which permits of thus obtaining a negative bias voltage from the picture carrier wave arriving at 11. In this arrangement, the intermediate frequency transformer 11a has its output connected with diode 12 through a capacitor 13, in shunt with resistor 14 on which is obtained the video-frequency current, with its direct component, which current is collected at 15 in the receiver device. This component is separated from the modulation current and its variations are slowed down in circuit 16—17, which has a very high time constant (of the order of some seconds). The negative bias voltage thus obtained is collected on rheostat 7 belonging to the relaxation oscillation generator 18 according to the invention.

Such a television receiver scanning device has many advantages, and in particular that of a high precision in operation, without risk of deterioration of the receiver fluorescent screen in case of stopping of the transmission.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with a television transmitter capable of sending out a carrier wave and synchronizing pulses, a television receiver which comprises, in combination, a self-oscillatory relaxation oscillation generator arranged to be blocked in response to the application of a given bias voltage on an element thereof, and means for supplying said bias voltage in response to reception of said carrier wave, said means having its output connected with said element, said relaxation oscillation generator including means responsive to said synchronizing pulses for neutralizing the action of said blocking means upon every reception of a synchronizing pulse.

2. For use in connection with a television transmitter capable of sending out a picture carrier wave and synchronizing pulses, a television receiver which comprises, in combination, a self-oscillatory relaxation oscillation generator arranged to be blocked in response to the application of a negative bias voltage on an element thereof, and means for supplying said bias voltage in response to reception of said carrier wave, said means having its output connected with said element, said relaxation oscillation generator including means responsive to said synchronizing pulses for neutralizing the action of said blocking means upon every reception of a synchronizing pulse.

3. For use in connection with a television transmitter capable of sending out a carrier wave and synchronizing pulses, a television receiver which comprises, in combination, a self-oscillatory relaxation oscillation generator arranged to be blocked in response to the application of a given bias voltage on an element thereof, a detector stage, and a high time constant filter circuit including a resistor inserted between the output of said detector stage and said element and an earthed capacitor in shunt with said resistance, for supplying such bias voltage to said element when said carrier wave is being transmitted, said relaxation oscillation generator including means responsive to said synchronizing pulses for neutralizing the action of said blocking means upon every reception of a synchronizing pulse.

HERBERT ERNYEI.

REFERENCES CITED

The following references are of record in the file of this patent:

UNITED STATES PATENTS

| Number | Name | Date |
| --- | --- | --- |
| 2,141,343 | Campbell | Dec. 27, 1938 |
| 2,231,792 | Bingley | Feb. 11, 1941 |
| 2,338,395 | Bartelink | Jan. 4, 1944 |
| 2,431,577 | Moore | Nov. 25, 1947 |
| 2,511,146 | Beste | June 13, 1950 |